(12) United States Patent
Shaheen et al.

(10) Patent No.: US 6,374,109 B1
(45) Date of Patent: Apr. 16, 2002

(54) WIRELESS COMMUNICATION SYSTEM AND SUBSCRIBER UNIT THAT SUPPORT SELECTION OF OPERATION FROM MULTIPLE FREQUENCY BANDS AND MULTIPLE PROTOCOLS AND METHOD OF OPERATION THEREFOR

(75) Inventors: Kamel M. Shaheen; Chenhong Huang, both of Plano, TX (US)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/629,788

(22) Filed: Jul. 31, 2000

Related U.S. Application Data (63) Continuation of application No. 08/994,353, filed on Dec. 19, 1997, now Pat. No. 6,128,490.
(60) Provisional application No. 60/045,995, filed on May 8, 1997, and provisional application No. 60/047,280, filed on Jun. 9, 1997.

(51) Int. Cl.⁷ .................................................. H04Q 7/22
(52) U.S. Cl. ...................... 455/434; 455/450; 455/525; 455/552; 455/553; 370/343
(58) Field of Search ................................ 455/552, 553, 455/434, 435, 450, 451, 452, 525, 575; 375/220; 370/343, 329, 330, 341, 347

(56) References Cited

U.S. PATENT DOCUMENTS

| | | | |
|---|---|---|---|
| 5,170,173 A | * 12/1992 | Krenz et al. | 455/575 X |
| 5,493,693 A | * 2/1996 | Tanaka et al. | 455/553 X |
| 5,878,349 A | * 3/1999 | Dufour et al. | 455/452 X |
| 5,915,214 A | * 6/1999 | Reece et al. | 455/552 X |
| 6,128,490 A | * 10/2000 | Shaheen et al. | 455/434 |

* cited by examiner

Primary Examiner—William Trost
Assistant Examiner—Philip J. Sobutka
(74) Attorney, Agent, or Firm—Bruce Garlick (57) ABSTRACT

A wireless communication system facilitates wireless communication with a subscribing unit operating within a respective service area. At least one base station supports wireless communication within the service area in a plurality of frequency bands and according to a plurality of communication protocols. In a broadcast message, a transmitting base station indicates to the subscribing unit the plurality of frequency bands and the plurality of communication protocols available. The subscribing unit receives the broadcast message and communicates with the base station on one of the plurality of frequency bands according to one of the plurality of communication protocols. In another embodiment, the system includes a plurality of base stations providing overlying coverage within the service area. In such systems, multiple broadcast message may provide information regarding the overlying coverage provided. The broadcast message may also include channel information that indicates the available channels within the available frequency bands, preference information, traffic levels within the frequency bands, available bandwidth within the frequency bands and system operator information that may indicates to the subscribing unit operation on reserved portions of the frequency band is available. The broadcast message may also indicate traffic levels on overlying systems, the bandwidth provided and cost of service for the overlying systems. A subscribing unit operating within the service area receives the broadcast message, makes operational decisions, may elicit additional information, makes operational determinations and communicates on a selected frequency band according to a selected communication protocol.

17 Claims, 6 Drawing Sheets

WIRELESS COMMUNICATION SYSTEM AND SUBSCRIBER UNIT THAT SUPPORT SELECTION OF OPERATION FROM MULTIPLE FREQUENCY BANDS AND MULTIPLE PROTOCOLS AND METHOD OF OPERATION THEREFOR

CROSS-REFERENCES TO RELATED APPLICATIONS

The present application is a continuation of U.S. patent application Ser. No. 08/994,353, filed Dec. 19, 1997 now issued as U.S. Pat. No. 6,128,490, which claims priority pursuant to 35 U.S.C. Sec. 119(e) to U.S. Provisional Application Ser. No. 60/045,995, filed May 8, 1997, and to U.S. Provisional Application Ser. No. 60/047,280, filed Jun. 9, 1997, pending, all of which are hereby incorporated herein by reference in their entirety.

BACKGROUND

1. Technical Field

The present invention relates generally to wireless communication systems; and more particularly to a wireless communication system supporting cooperative selection of frequency bands, radio frequency (RF) channels, protocols and protocol revisions for subsequent communications between the network and subscribing units operating within a service area supported by the network. Further, the present invention relates to a wireless communication system in which the necessary system operating information is contained within the broadcast messages, such operating information Used in the selection of the mode of operation (Digital or Analog) and the selection of the frequency band in which the wireless communication services are provided.

2. Related Art

Wireless communication systems are well known in the art. Such systems facilitate communication between a user of a wireless subscribing unit and users of other wireless subscribing units as well as between wireless subscribing units and users of wired units, such as those attached to the public switched telephone network. Depending upon the particular implementation, wireless communication systems may operate according to multiple protocols in particular frequency bands and on particular channels contained within the frequency bands. Frequency bands currently in use in North America and around the world for wireless communications include the 800 MHz (cellular) band and the 1900 MHz (PCS) band among others.

Various communication protocols have been developed to standardize different wireless communication technologies. These communication protocols include, for example, the Advanced Mobile Phone Service (AMPS) standards, the Narrowband Advanced Mobile Phone Service (NAMPS) standards, the Global Standard for Mobility (GSM), the Code Division Multiple Access (CDMA) standards and the Time Division Multiple Access (TDMA) standards among others. Further, these standardized protocols typically include various protocol revisions that must be accommodated, the protocol revisions further defining how additional wireless communication services and features are supported.

In most installations, a plurality of base stations managed by a mobile switching center (MSC) support wireless communications within a particular geographic area. Together, these components are referred to as a "network" and provide wireless coverage within a service area. Typically, separate service providers maintain their own service areas which may overlap one another, each service provider maintaining a network to support its wireless service. Large geographic areas, often referred to as metropolitan trading areas (MTA), are typically serviced by multiple service providers. To maximize revenues, each service provider desires to serve a maximum number of subscribing units within the MTA. Presently, such may only be accomplished by having each user subscribe to a particular service provider.

With the advent of multiple communication protocols and technologies, in an effort to serve more subscribing units, service providers may provide wireless service in multiple frequency bands and according to multiple communication protocols. For example, the service provider may support both AMPS standards and CDMA standards on the cellular band while supporting only CDMA standards on the PCS band. While such multiple offerings may increase the potential number of subscribing units that may be served, the coordination between various communication protocols and various frequency bands within the system is required. However, the mechanism by which the system can coordinate this complex operation is not specified in the current standards. Further, because of the relative expense of supporting the multiple frequency bands and the multiple communication protocols, most service providers are limited to providing services for less than the full possible offering sets.

Manufacturers of subscribing units have responded to multiple service offerings by producing subscribing units that operate across multiple frequency bands and according to multiple protocols. For example, a multiple mode subscribing unit may support both operation under the analog AMPS (e.g., EIA/TIA-553, IS-91A) standard and operation under the digital CDMA (e.g., IS-95, IS-95B) standard which operates in multiple frequency bands. Further, in other situations, the subscribing units may operate under both AMPS (e.o., EIA/TIA-553) standard and the TDMA (e.g., IS-136) standard which operates in multiple frequency bands. However, coordinating operation for the subscribing unit in the multiple frequency bands and according to multiple protocols has proven difficult. Since the multiple mode subscribing units operating according to analog standards in multiple mode systems typically do not indicate the capability of the network, identifying operating capabilities, much less choosing from the available operating capabilities, has been difficult if not impossible.

As the number of subscribers operating within a particular service area increases, traffic within the service area also increases. Oftentimes, access and traffic channels are not available when requested and subscribers cannot access the system when desired. To compound problems, most subscribing units operate according to older analog protocols. Thus, even when sufficient bandwidth is available on the PCS bands to support communication for all multiple mode digital (CDMA) subscribing units in a certain service area, traffic problems may still exist. Further, due to shortcomings in the operation of subscribing units that can operate in both the AMPS standard and the CDMA standard, the subscribing units often fail to move to the less trafficked CDMA frequency bands due to lack of system information on the broadcast signal and lack of communication facilities between the subscribing units and the base station.

Thus, there exists a need in the art for a wireless communication system that efficiently causes subscribing units to operate among the various available frequency bands and protocols and to allow the subscribing units to request additional information from the AMPs networks regarding these frequency bands.

SUMMARY OF THE INVENTION

A wireless communication system according to the present invention facilitates wireless communication with a multiple mode subscribing unit operating within a respective service area. The wireless communication system includes a base station that provides the wireless communication within the service area in a plurality of frequency bands and according to a plurality of communication protocols. In a broadcast message on the AMPS control channel, the base station indicates to the subscribing unit the plurality of frequency bands and the plurality of communication protocols available. The subscribing unit receives the broadcast message. Based on the information provided and based on the user preferred mode of operation, the subscribing unit may decide to communicate with the base station to request additional information on one of the plurality of frequency bands. To accomplish these operations, the base station may include a broadcast message unit and the subscribing unit may include a selection unit. When all pertinent information has been exchanged, the subscribing unit, in conjunction with the network, selects a particular set of operating parameters and proceeds in operation.

The broadcast message may also include channel information that indicates the availability of a certain communication protocol and the available RF channels within the frequency bands. Further, the broadcast message may also include preference information that indicates preferred operation among the plurality of frequency bands and among the plurality of communication protocols. Additionally, the broadcast message may include preference information that indicates traffic levels within at least one frequency band of the plurality of frequency bands. Moreover, the broadcast message may include preference information that indicates available bandwidth within at least one frequency band of the plurality of frequency bands. Based upon the preference information, the subscribing unit may select operation in the frequency bands and operating protocols. The broadcast message may also include system operator information that is available to a subscribing unit. Such system operator information indicates to the subscribing unit portions of at least one frequency band reserved for the subscribing unit.

In a particular embodiment of the present invention, the plurality of frequency bands include the 800 MHz frequency band and the 1900 MHz (PCS) frequency band. In the embodiment, the plurality of communication protocols may include an analog protocol and a code division multiple access protocol such as the AMPs protocol and the CDMA protocol, respectively. However, other embodiments may support additional protocols as well.

Construction of the wireless communication system includes at least one mobile switching center and a plurality of base stations that together provide wireless coverage within the service area. The plurality of base stations are coupled to the mobile switching center and each provide wireless communication within a respective portion of the service area. In the embodiment, at least one of the plurality of base stations provides service in a plurality of frequency bands and according to a plurality of communication protocols. At least one of the plurality of base stations indicates the plurality of frequency bands and the plurality of communication protocols in a broadcast message. A subscribing unit operating within the service area receives the broadcast message, makes operational decisions and communicates with one of the base stations on a selected frequency band according to a selected communication protocol.

In the embodiment, the broadcast message may further include bandwidth information for at least one of the plurality of base stations and, based upon the contents of the broadcast message, the subscribing unit may establish communication with one of the base stations to obtain a desired bandwidth. The broadcast message may also include cost of service information for at least one of the plurality of base stations so that the subscribing unit establishes communication with one of the base stations based upon a desired cost of service.

In other embodiments, sets of base stations provide overlying wireless coverage in differing frequency bands and/or that operate according to differing communication protocols. For example, a first set of base stations may operate according to the AMPS operating protocol in the 800 MHz band, while a second set of base stations operates in the PCS band according to the CDMA operating protocol and a third set of base stations operates in the 800 MHz band according to the CDMA operating protocol. In the embodiment, the overlying systems may be supported by differing system operators, with each of the system operators providing differing types, grades and costs of service. However, two of the systems may be operated by a common operator, for example the 800 MHz AMPS system and the PCS CDMA system. However, the common operator having a installed a separate infrastructure for each of the overlying systems.

With such overlying systems installed, the operator of the system may provide broadcast messages on each commonly owned system that notifies subscribing units within the area of the existence and operating parameters of each of the overlying systems. Further, operators of competing overlying systems may agree to broadcast information regarding the overlying system of their competitor. In either case, upon receipt of the broadcast information, a subscribing unit will determine a preferred system of the overlying systems and initiate operation with the preferred system.

Moreover, other aspects of the present invention will become apparent with further reference to the drawings and specification which follow.

DETAILED DESCRIPTION OF THE DRAWINGS

Figure 1A:
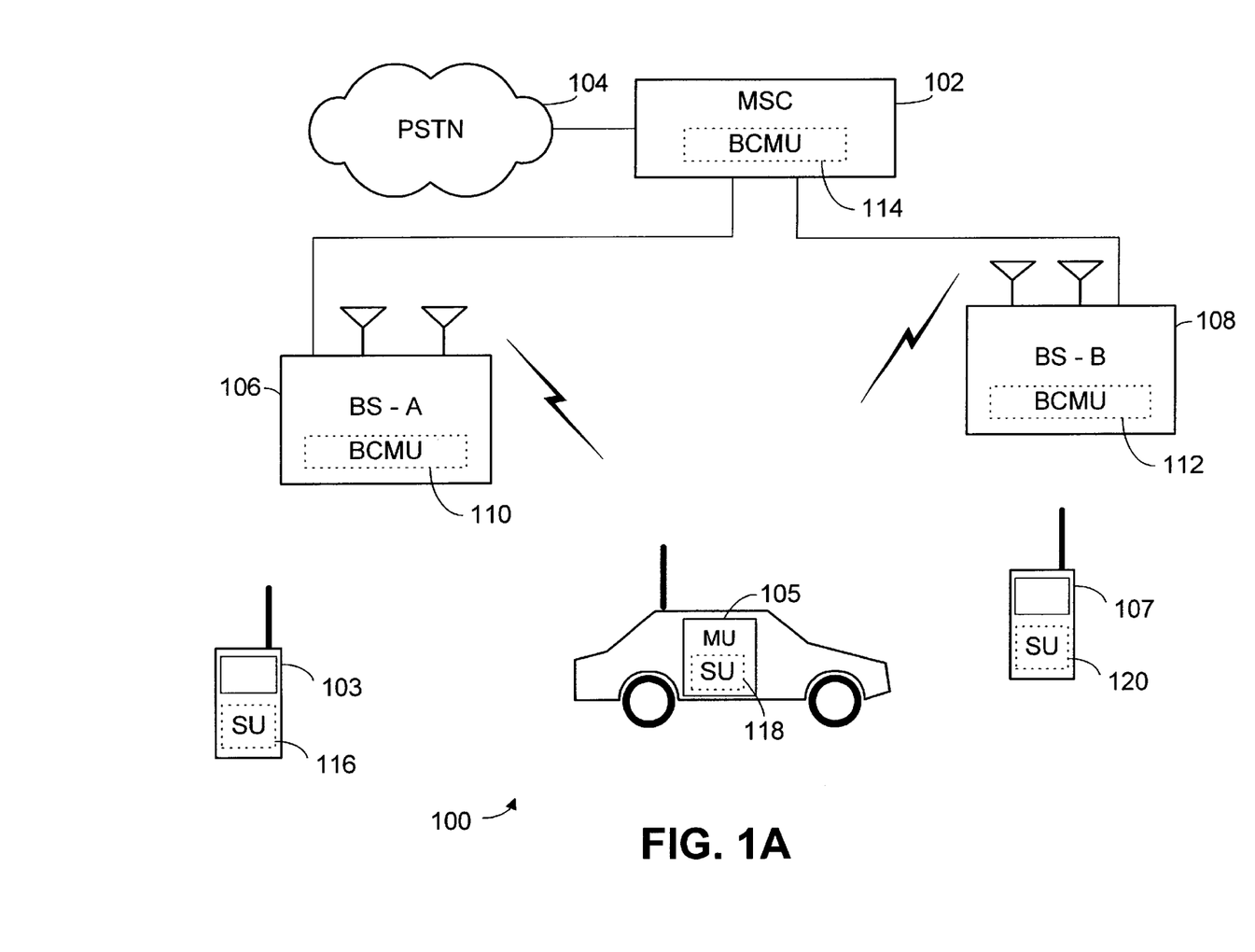
FIG. 1A is a block diagram illustrating a wireless communication system constructed according to the present invention wherein the network broadcasts frequency band, channel and protocol information.

FIG. 1A illustrates a wireless communication system 100 constructed according to the present invention. The wireless communication system 100 includes a mobile switching center (MSC) 102 and base stations 106 and 108 providing wireless service to subscribing units 103, 105, and 107. The MSC 102 provides access to the public switched telephone network (PSTN) 104. The MSC 102 and the base stations 106 and 108 are together referred to as the "network" which provides wireless communications throughout a service area. The network, therefore facilitates communication among the subscribing units 103, 105 and 107 and between any of the subscribing units 103, 105 and 107 and other units coupled to the PSTN 104. Of course, such connections also enable communication between the subscribing units 103, 105 and 107 and subscribing units operating in other systems as well.

Base stations 106 and 108 and MSC 102 include broadcast message units (BCMUs) 110, 112 and 114, respectively. The BCMUs 110, 112 and 114 work, in combination, to broadcast broadcast messages within the service area. Broadcast messages includes information relating to the manner in which the subscribing units 103, 105 and 107 operate within the service area. However, as will be described more fully hereinafter, the broadcast messages may include additional types of information as well.

As is shown, each of the base stations 106 and 108 includes multiple antennas. The multiple antennas indicate that the base stations 106 and 108 operate on multiple frequency bands and/ or operate according to multiple operating protocols. In the particular embodiment illustrated, the base stations 106 and 108 are shown to be unitary structures connected directly to the MSC 102. However, each base station may include a plurality of components dispersed throughout a service area. For example, each base station may include multiple base transceiver stations, each servicing a respective communication cell. Multiple base transceiver stations, each operating in a respective frequency band and according to a respective communication protocol. antennas of the base transceiver stations may share a single tower structure. As is appreciated, many differing embodiments of base stations may be constructed according to the present invention, each providing the benefits associated with the present invention.

Broadcast messages are typically broadcast on a control channel. In one embodiment wherein the base stations 106 and 108 support both analog and digital standards, the broadcast messages are broadcast on an analog channel channel. However, the broadcast messages may also be broadcast on a dedicated broadcast channel. Each base station 106 and 108 may transmit a unique broadcast message, relating information specific to the respective base station. However, in other embodiments, the base stations 106 and 108 may transmit a common broadcast message. In still other embodiments, one group of base stations controlled by the MSC 102 may broadcast a first broadcast message while other groups of base stations controlled by the MSC 102 may broadcast a second broadcast message.

In one embodiment, each base station 106 and 108 includes a separate BCMU, 110 and 112, respectively. In the embodiment, the BCMUs 110 and 112 operate substantially independently from each other, broadcasting information specific to the respective base station, 106 and 108, respectively. In another embodiment, neither base station 106 or 108 includes a BCMUs, with a single BCMU 114 located in the MSC 102 coordinating and directing all broadcast messages sent from connected base stations 106 and 108. In either case, or in any other construction, the BCMUs 110, 112 and 114 may be constructed either as specialized hardware or as generalized hardware that is specifically programmed to execute the operations of the present invention.

Broadcast messages may include frequency band information, channel information, protocol information and such other information as is helpful in managing communications within the service area. The subscribing units 103, 105 and 107 receive the broadcast messages and, based upon the broadcast messages, determine in which frequency band, on which channels and according to which protocols to operate. In selecting such operations, the subscribing units 103, 105 and 107 may simply act based upon the information received in the broadcast message and/or upon their own preferred mode of operation. However, in other embodiments, the subscribing units 103, 105 and 107 communicate with the network to receive additional information used to make the operational determinations.

The broadcast message may include additional information used in selecting additional operating parameters. For example, the broadcast messages may include information describing the capacity and capabilities of neighboring base stations, traffic on the broadcasting base station, traffic on neighboring base stations and various other types of information that may be employed to indicate in which bands, upon what channels and according to which protocols operation within the service area should be had.

Each of the subscribing units 103, 105 and 107 includes a selection unit (SU). Subscribing unit 103, which is a hand held unit, includes SU 116. Subscribing unit 105 which is located within an automobile includes SU 118. Further, subscribing unit 107 includes SU 120. The SUs 116, 118, and 120 operate in response to a broadcast message received from the network to determine in which frequency bands, on which channels and according to which protocols the respective subscribing unit will operate in subsequent communications with the network.

Figure 1B:
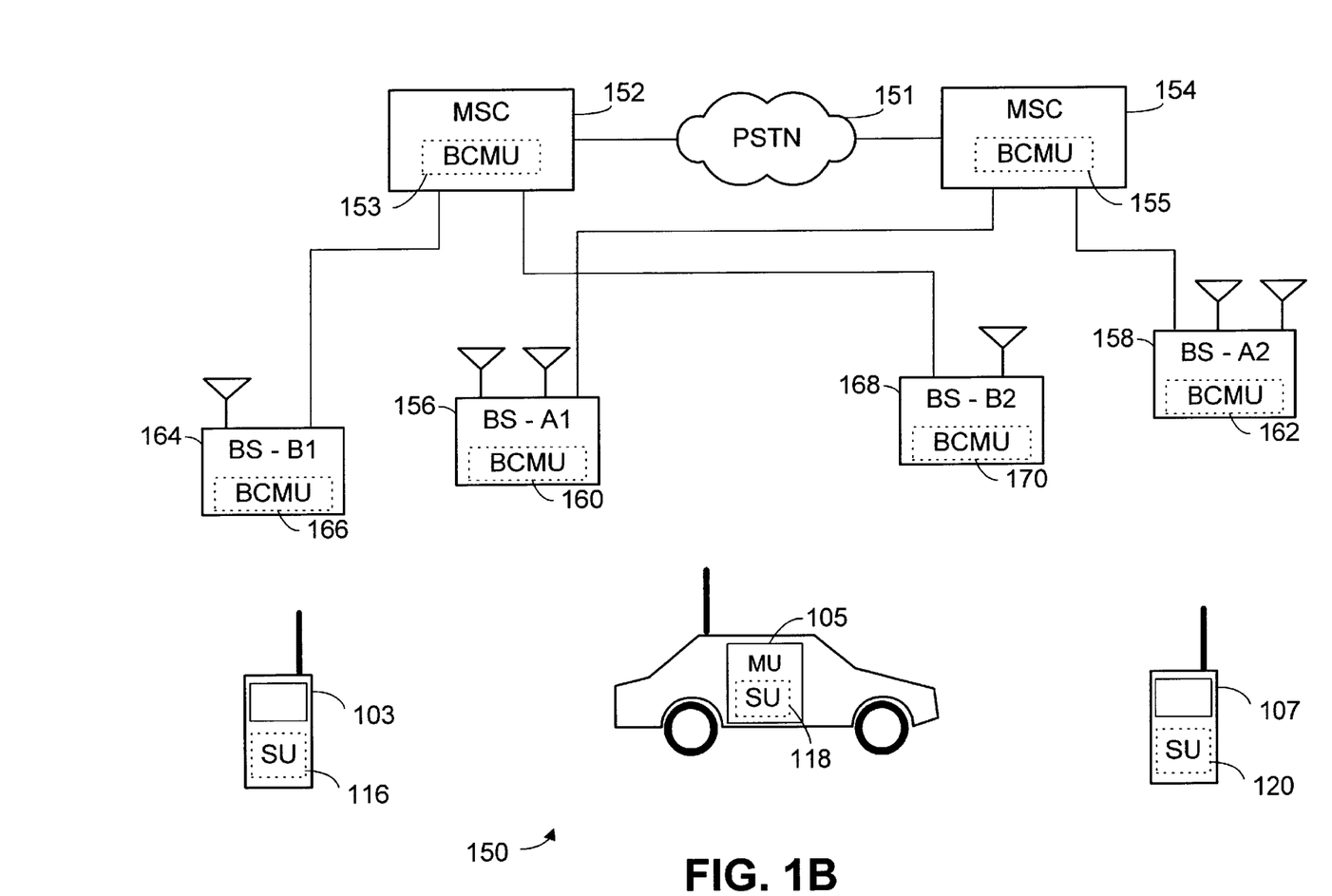
FIG. 1B is a block diagram illustrating another embodiment of a wireless communication system constructed according to the present invention wherein the network broadcasts frequency band, channel and protocol information.

FIG. 1B illustrates a wireless communication system 150 constructed according to the present invention in which two networks provide overlying coverage within a single service area. Subscribing units 103, 105 and 107 residing within the single service area may be serviced by either of the overlying networks. A first network includes MSC 152 and base stations 164 and 168. The second network includes MSC 154 and base stations 156 and 158. As shown, the MSCs 152 and 154 of the first and second networks connect via the PSTN 151 which is employed to route communications between the networks.

The base stations 164 and 168 of the first network each include single antennas that support operation on a single frequency according to a single communication protocol. Base stations 156 and 158 each include two antennas that support operation on two frequencies and according to two communication protocols. As an example of such operations, the two frequencies include the 800 MHz band and the PCS band while the two communication protocols include AMPS and CDMA protocols. Such protocols may be in accordance with IS-91A, TIA/EIA 691, TIA/EIA 553A, IS-95B or later revision protocols.

The MSC 152 and base stations 164 and 168 of the first network include BCMUs 153, 166 and 170, respectively. These BCMUs 153, 166 and 170 cause the first network components to broadcast at least one first network broadcast message. Further, the MSC 154 and base stations 156 and 158 of the second network include BCMUs 155, 160 and 162, respectively. These BCMUs 155, 160 and 162 cause the second network components to broadcast at least one second network broadcast message. While the first network broadcast message informs listening subscribing units 103, 105 and 107 of the capabilities of the first network, the second broadcast message informs the listening subscribing units of the capabilities of the first network. Further, either of the broadcast messages could also inform the subscribing units 103, 105 and 107 of the capabilities of the other network providing overlying coverage. Based upon the information then, the subscribing units 103, 105 and 107 select operation from the available options provided.

As will be appreciated from the description relating to FIGS. 1A and 1B, many various configurations may be constructed, each of which embodies the principles of the present invention. Such embodiments include a single network having multiple operating capabilities and overlying networks providing, either singularly or in combination, multiple operating capabilities. The construction of any of the embodiments is limited only by the needs of the particular installation and the equipment available for installation.

Figure 2:
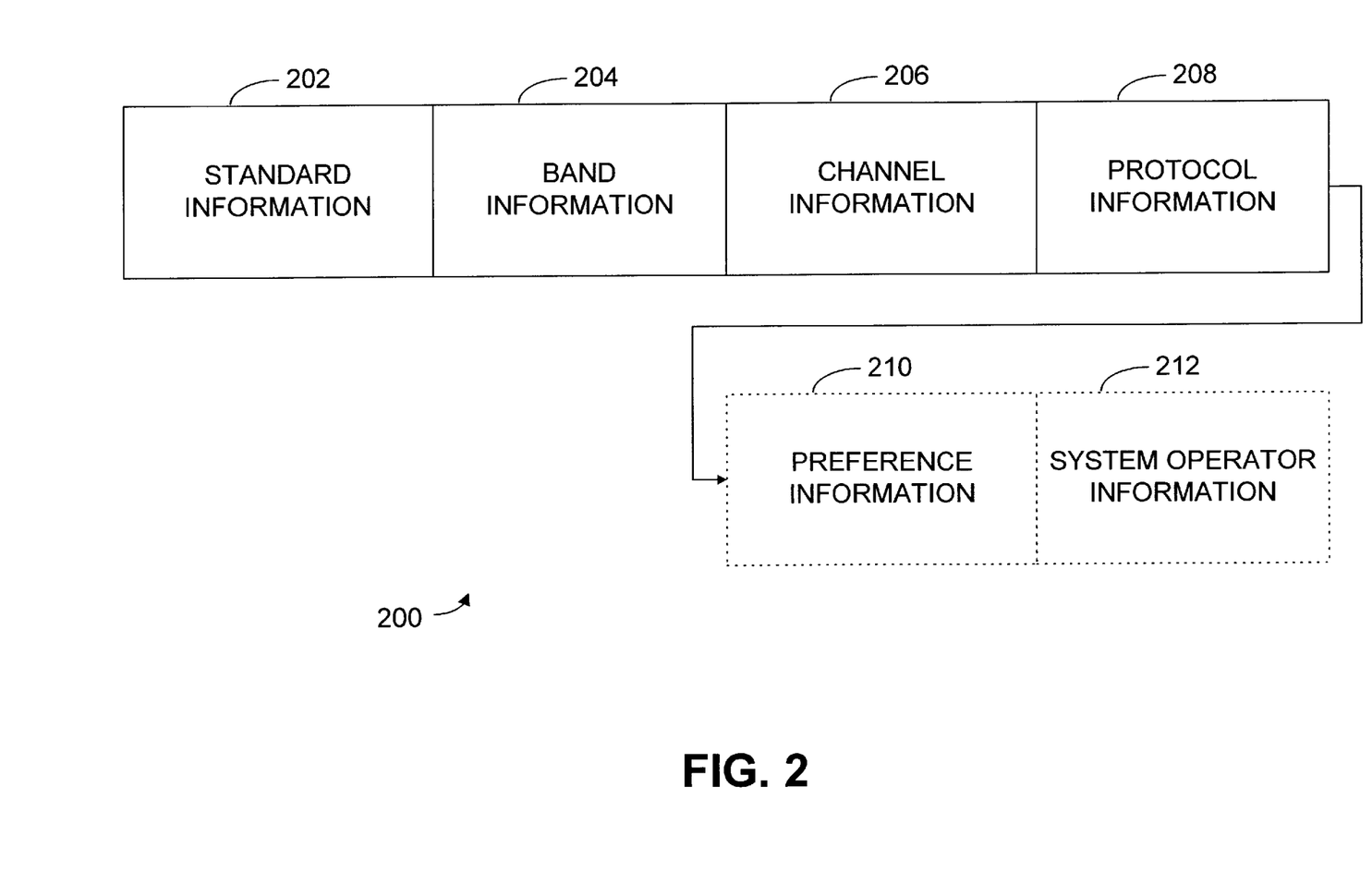
FIG. 2 is a representation of information contained within a broadcast message transmitted by a base station constructed according to the present invention.

FIG. 2 illustrates generally a broadcast message 200 that may be generated by one of the BCMUs 110, 112 or 114 of FIG. 1A, broadcast by a respective base station and received by one of the subscribing units 103, 105 or 107. The broadcast message 200 includes standard information 202 relating to operation within a respective portion of the service area. Such standard information is known in the art and will not be further described herein except as to expand upon the teachings of the present invention. The broadcast message 200 also includes frequency band information 204 that describes the frequency bands in which operation is supported. For example, base station 106 may support operation within the 800 MHz frequency band (800 MHz band) and within the 1900 MHz frequency band (PCS band) while base station 108 may support operation only within the 800 MHz band. In the case, then, the broadcast message broadcast from base station 106 would indicate both the 800 MHz band and the PCS band while the broadcast message broadcast from base station 108 would indicate only the 800 MHz band. In other systems, depending upon the frequency bands supported, additional bandwidths may be indicated within the frequency band information 204.

The broadcast message 200 also includes channel information 206 that indicates on which channels within each frequency band communication is supported by the network. The channel information 206 may also include information relating to control channels within the particular bands. The channel information 206 is used by the subscribing units thereafter in communicating with the base station 102 over the particular channels designated.

The protocol information 208 contained within the broadcast message 200 indicates which communication protocols are supported by the base station 102 in the particular frequency bands supported. For example, a particular broadcast message may indicate that the base station 106 does not support the CDMA standard in the 800 MHz band and supports the CDMA standard in the PCS band. Upon receiving the broadcast message, subscribing unit 103 determines that it may operate either according to the AMPS standard in the 800 MHz band, according to the CDMA standard protocol in the 800 MHz band, or according to the CDMA standard protocol in the PCS band.

Optionally, the broadcast message 200 may include preference information 210 and system operator information 212. The preference information 210 may reveal an operating preference to subscribing units in establishing communication with a particular frequency band. For example, with reference to FIG. 1A, when subscribing unit 103 enters a portion of the service area served by base station 106, it receives a broadcast message from the base station 106 that includes preference information. Based upon the preference information 210, the subscribing unit 103 may determine that operation in the PCS band according to the CDMA protocol is desirable as compared to operation according to the AMPS protocol in the 800 MHz band. Such preference may be indicated due to relatively lower traffic levels within the PCS band.

The system operator information 212 may also include additional information such as stock quotations, sports news, traffic information, weather information, and various other pieces of information. Moreover, the system operator information 212 may also indicate charges that will be made for accessing the base station 102. The user of the subscribing unit 106, or the subscribing unit 106 automatically, may then choose operation based upon the quoted rate. When multiple operators compete to provide service in a particular geographical area, a particular subscribing unit may receive broadcast messages from a plurality of base stations. Based upon the rates quoted in the broadcast messages and other pertinent operating information for the completing operators, the subscribing unit 106 may then indicate a preferred network to the user of the subscribing unit 106 or automatically select the low cost provider.

The system operator information 212 may also indicate the bandwidth that the base station 108 may provide to the subscribing unit 106. Available bandwidth information may be of significant importance in high speed data (HSD) applications wherein a user desires to transmit data via the wireless communication system 100. In such case, the system operator information 212 may indicate the amount of bandwidth available in each frequency band and/or on each available channel in each available frequency band. Based upon such indication, the subscribing unit 106 may select operation in an available frequency band and according to a particular protocol to achieve a desired bandwidth. Further, based upon such communication, the subscribing unit. 106 may determine that sufficient bandwidth is unavailable via the broadcasting base station 108 and may initiate communication with a satellite or a differing base station that has greater bandwidth.

In combination, therefore, the BCMUs 110, 112 and 114 and the various SUs 116, 118 and 120 operate in cooperation with one another to optimize operation within the service area provided by the network. Not only will such operations distribute traffic among available bands but will optimize communications with the subscribing units 103, 104, and 106 by taking advantage of the capabilities of the subscribing units and the capabilities of the base stations 106 and 108.

Figure 3:
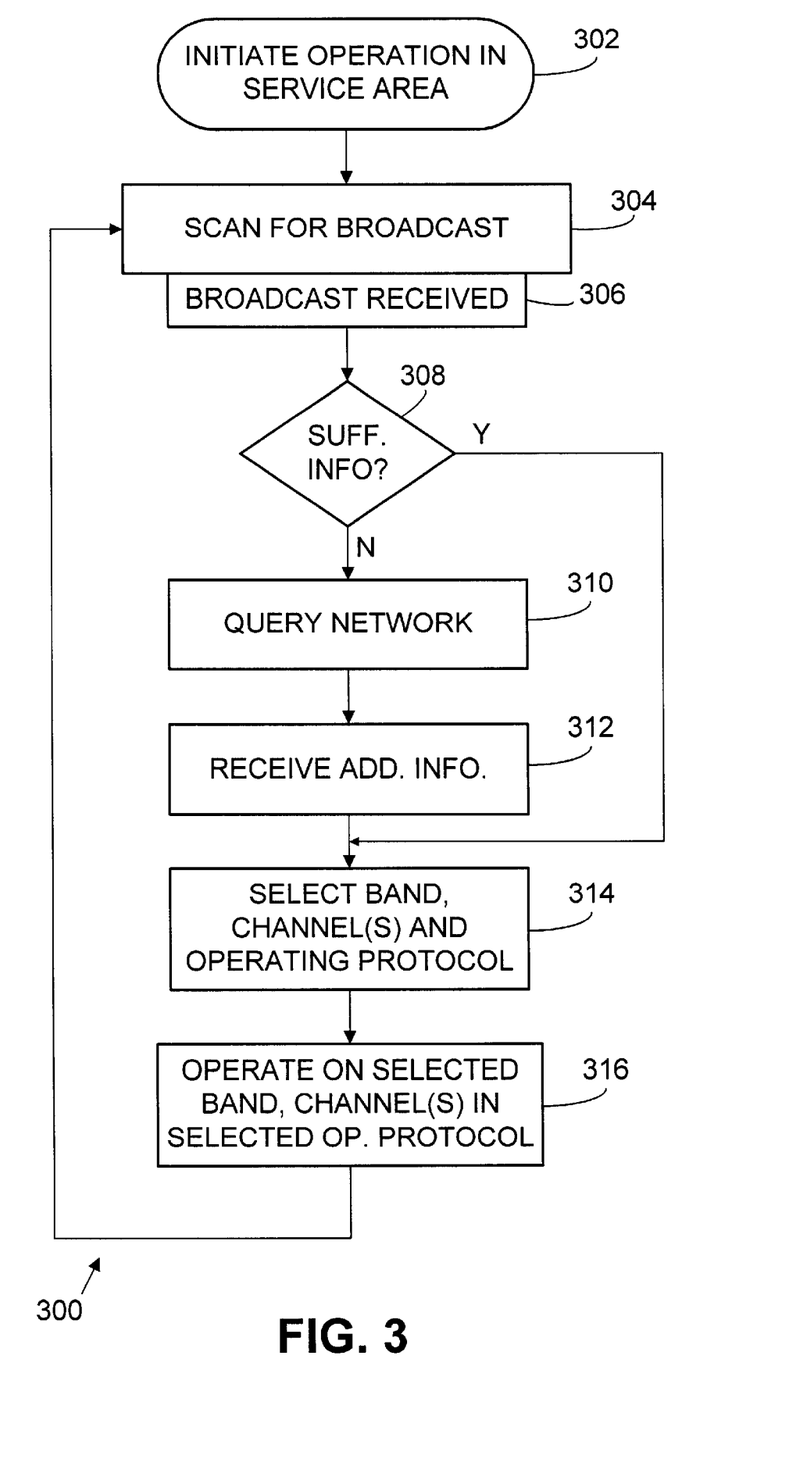
FIG. 3 is a logic diagram illustrating operation of a wireless communication system constructed according to the present invention in transmitting a broadcast message, receiving such broadcast message and selecting a particular frequency band and particular protocol of operation for optimal communication with the base station.

FIG. 3 is a flow diagram illustrating operation 300 of the wireless communication system 100 of FIG. 1A. For simplicity in description, operation is described with reference to subscribing unit 103 of FIG. 1A. However, operation may be accomplished with respect to any of the subscribing units constructed according to the present invention and operating within the service area. Further, while operation is described with reference to base station 106, such operation could also be accomplished with base station 108, with any other base station, or with multiple of the base stations.

Operation commences at step 302 wherein the subscribing unit 103 initiates operation within a cell supported by base station 106. Upon such initiation, the subscribing unit 103 scans for a broadcast message at step 304. The broadcast message may be provided on a control channel or may be provided on a dedicated broadcast channel. When the broadcast message is provided on one of a plurality of control channels, the subscribing unit 103 scans the control channels upon which the broadcast message may be transmitted. However, when a dedicated broadcast channel exists throughout all potential operating areas, the subscribing unit 103 would listen to the dedicated broadcast channel for the broadcast message. Therefore, the scanning operation of step 304 depends upon the particular construction of the wireless communication system 100.

From step 304, operation proceeds to step 306 wherein the subscribing unit 103 receives the broadcast message. From step 306, operation proceeds to step 308 wherein the SU 116 within the subscribing unit 103 determines whether sufficient information has been received in the broadcast message to determine a desired operation. If the SU 116 determines that sufficient information has been received in the broadcast message at step 314, the SU 116 selects the frequency band of operation, channel of operation and communication protocol to be employed. From step 314, operation proceeds to step 316 wherein the subscribing unit 103 operates according to the selected frequency band, channel and protocol. In making the determination, further interaction will be required between the subscribing unit 103 and the network to initiate the operation. Such operations are generally known and will not be described further herein except as to expand upon the principles of the present invention.

However, if at step 308 it is determined that insufficient information was contained within the broadcast message to select a particular frequency band, channel and operating protocol, operation proceeds to step 310 wherein the subscribing unit 103 queries the base station 106 for additional information relating to the operation of the base station 106. Then, at step 312, the base station 106 the subscribing unit 1003 receives the additional information relating to the operation of the base station 106. Based upon the additional information, operation proceeds to steps 314 and 316 wherein the frequency band of operation, channel of operation and protocol are selected and operation continues according thereto.

Figure 4:
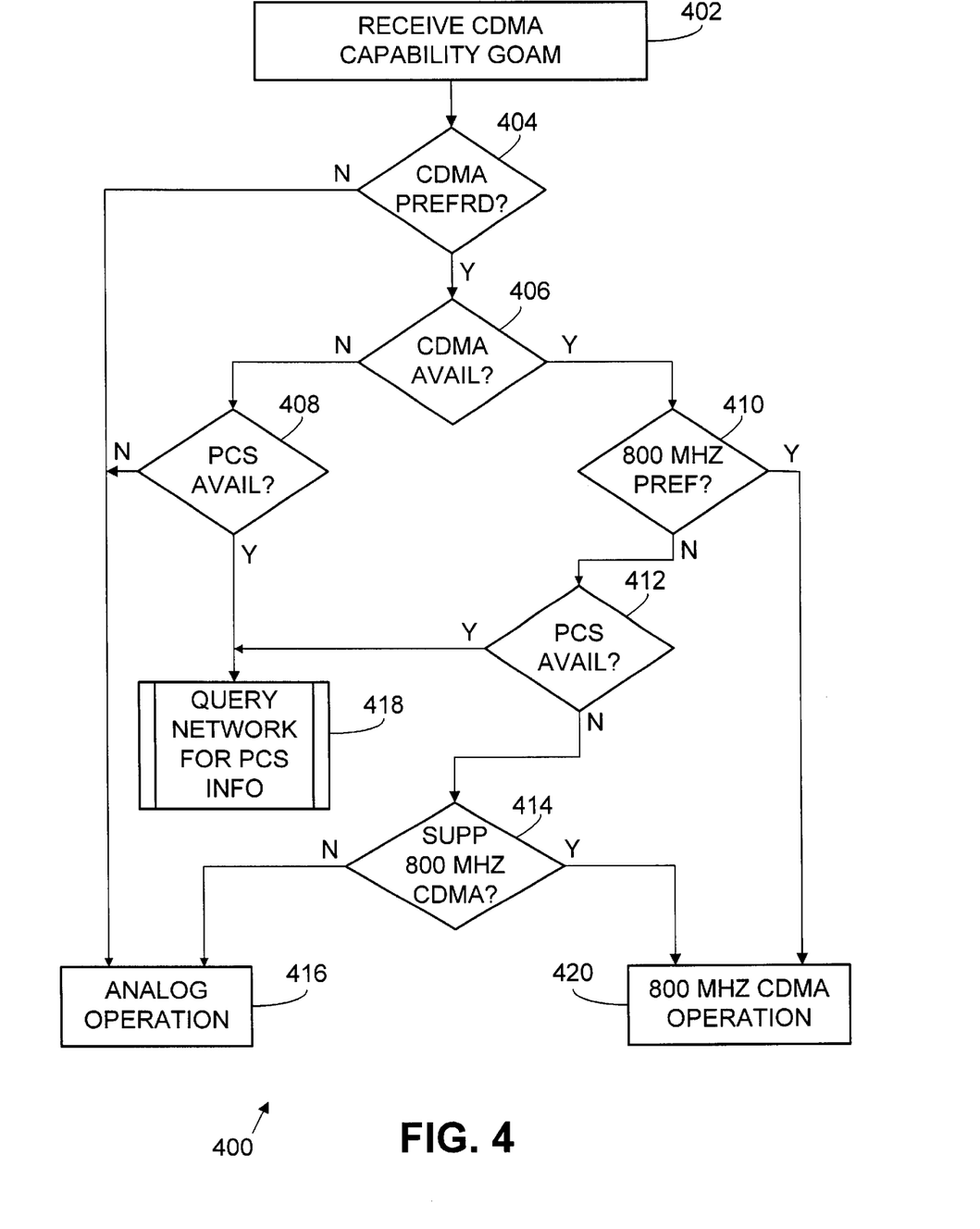
FIGS. 4 and 5 are logic diagrams illustrating operation of a wireless communication system according to the present invention in selecting operation among analog protocol or CDMA protocol and in selecting operation among the 800 MHz frequency band and the PCS frequency 1900 MHz band.

FIG. 4 illustrates particular operation 400 of the subscribing unit 103 in conjunction with the base station 106 in determining whether to operate in the 800 MHz band or the PCS band and whether to operate according to the AMPS standard or the CDMA standard. Steps illustrated in FIG. 4 are substantially consistent with, but more specific, than those described with respect to FIG. 3.

Operation commences at step 402 wherein subscribing unit 103 receives a CDMA capability global access message (GOAM) which serves as the broadcast message sent by the base station 102. Table 1 above illustrates the GOAM. In the GOAM, CDMA_FREQ represents the channel number of the CDMA frequency assignment to acquire. CDMA_AVAIL is set to '1' if CDMA is available. Also, PCS_CDMA_AVAIL is set to '1' if PCS CDMA is available. Thus, the GOAM provides minimal information that is used by the SU 116 in the subscribing unit 103 in selecting operation.

Based upon this broadcast message, the SU 120 within subscribing unit 106 determines whether CDMA operation is preferred at step 404. Such preference may have been previously made for the subscribing unit 106 and may have been preprogrammed within the subscribing unit 106 at a previous time. If at step 404 it is determined that CDMA operation is not preferred, operation proceeds to step 416 wherein the subscribing unit 106 operates according to the analog AMPS standard in the 800 MHz band.

TABLE 1

CDMA Capability Global Access Message (GOAM)

| Information Element | Length (bits) |
| --- | --- |
| $T_1T_2$ = 11 | 2 |
| DCC | 2 |
| ACT = 0100 | 4 |
| CDMA_FREQ | 11 |
| CDMA_AVAIL | 1 |
| PCS_CDMA_AVAIL | 1 |
| HSD_AVAIL | 1 |
| RSVD = 000 | 3 |
| END | 1 |
| OHD = 100 | 3 |
| P | 12 |

If at step 404 it is determined that CDMA operation is preferred, operation proceeds to step 406 wherein the SU 116 determines whether or not CDMA operation is available. Such determination is made by the SU 116 by investigating the CDMA_AVAIL bit provided within the GOAM broadcast message. If the CDMA_AVAIL bit is not enabled (set to '0') at step 406, operation proceeds to step 408 wherein the SU 116 determines whether PCS operation is available by investigating the PCS_CDMA_AVAIL bit. If PCS operation is determined not to be available at step 408, operation proceeds to step 416 wherein the subscribing unit 106 continues analog operation according to the AMPS protocol in the 80. However, if PCS operation is available, then operation proceeds to step 418 wherein the subscribing unit 106 queries the base station 102 for additional information. Such operation will be described further herein with respect to FIG. 5.

If at step 406 it is determined that CDMA_AVAIL is enabled, operation proceeds to step 410 wherein the subscribing unit 103 determines whether 800 MHz operation is preferred. If 800 MHz operation is preferred at step 410, operation proceeds to step 420 wherein the SU 116 initiates operation of the subscribing unit 106 according to the CDMA protocol in the 800 MHz band. Such continued operation is known and is not further described herein. However, if at step 410 it is determined that 800 MHz operation is not preferred, operation proceeds to step 412 where it is determined whether the PCS_CDMA_AVAIL bit is enabled. If the PCS_CDMA_AVAIL bit is enabled, operation proceeds to step 418 wherein further querying of the base station 106 is performed.

However, if the PCS_CDMA_AVAIL bit is not enabled at step 412, operation proceeds to step 414 where it is determined whether the subscribing unit supports CDMA operation in the 800 MHz band. In the particular implementation, the 800 MHz band may be considered band class zero which represents the default band. If the subscribing unit 106 does not support CDMA protocol operation in the 800 MHz bandwidth at step 414, operation proceeds to step 416 wherein the SU 116 determines that the subscribing unit 106 continues its operation according to the AMPS protocol in the 800 MHz band. However, if at step 414 the SU 116 determines that the subscribing unit 103 does support operation according to the CDMA standard in the 800 MHz band, operation proceeds to step 420 where such operation is initiated.

Figure 5:
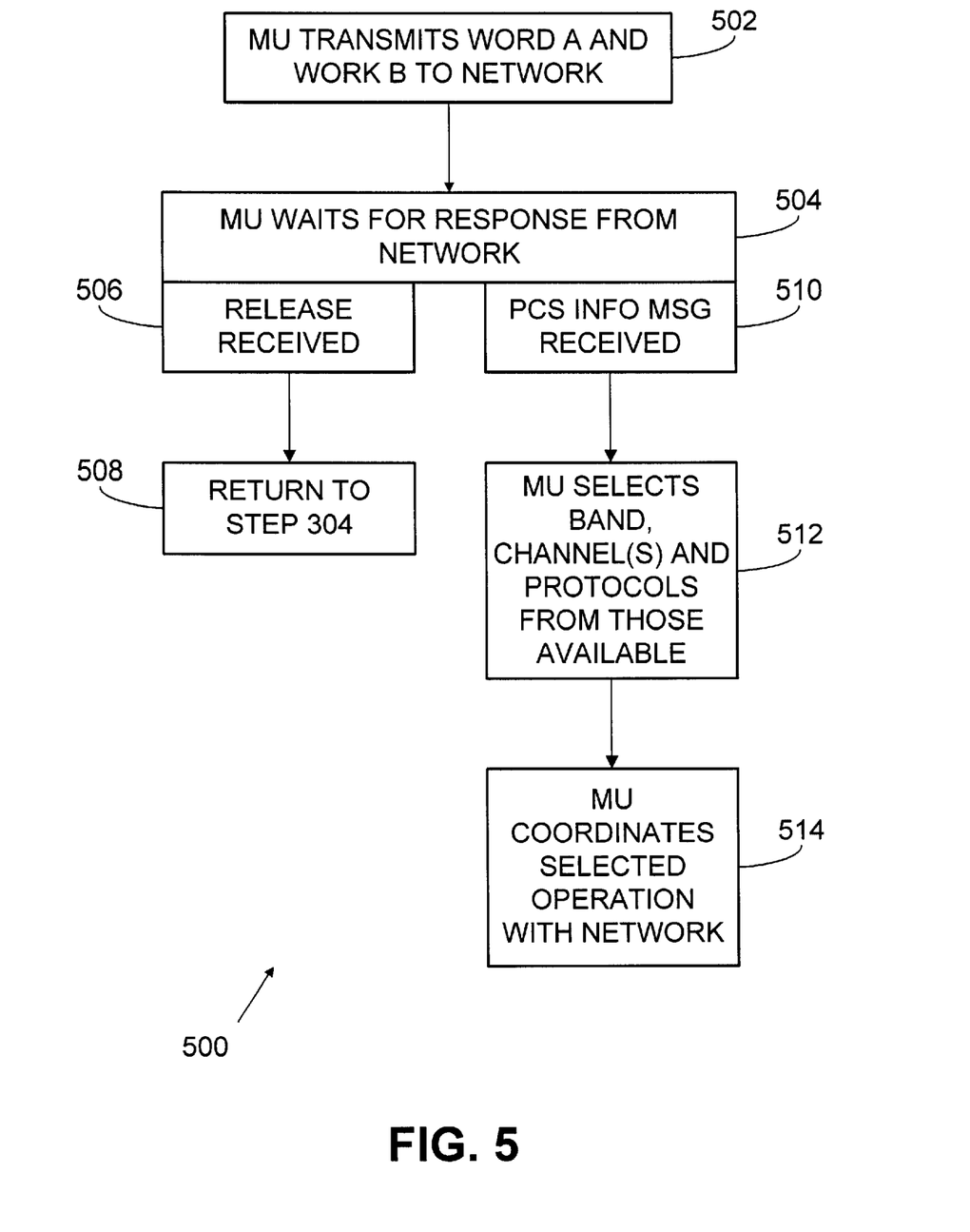

FIG. 5 illustrates steps taken in the operation of the SU 116 and subscribing unit 103 in accordance with step 418 of FIG. 4. The operation 500 allows the subscribing unit 103 and SU 116 contained therein to illicit further information from the base station 102 so as to potentially enable operation within the PCS band.

TABLE 2

Word A - Abbreviated Address Word

| Information Element | Length (bits) |
|---|---|
| F | 1 |
| NAWC | 3 |
| T | 1 |
| S | 1 |
| E | 1 |
| ER=0 | 1 |
| SCM (3–0) | 4 |
| MIN1 | 24 |
| P | 12 |

At step 502 the subscribing unit 106 transmits word A and word B to the base station 102. Table 2 and Table 3 illustrate the contents of word A and word B, respectively. As is shown, the contents of word A and word B identify the subscribing unit 106 to the base station 102 and also provide an indication to the base station 102 that the subscribing unit is making a PCS query type access.

Upon completion of step 502, operation proceeds to step 504 wherein the subscribing unit 106 waits for a response from the base station 102. If a release is received at step 506, operation of the subscribing unit 106 proceeds, at step 508, to step 304 of FIG. 3. At step 510, the subscribing unit receives a PCS information message from the base station 102. The PCS information message includes information illustrated in Tables 4, 5, and 6. As shown, Table 4 illustrates an Abbreviated Address Word, Table 5 illustrates an Extended Address Word and Table 6 illustrates a PCS Information Word. However, it multiple channels are available within the PCS band, the PCS Information Word is repeated within the PCS information message to indicate to the subscribing unit 106 such other channels within the PCS band which are available.

TABLE 3

Word B - Extended Address Word

| Information Element | Length (bits) |
|---|---|
| F = 0 | 1 |
| NAWC | 3 |
| LOCAL/MSG_TYPE = TBD | 5 |
| ORDQ = TBD | 3 |
| ORDER = TBD | 5 |
| LT | 1 |
| EP | 1 |
| SCM(4) | 1 |
| MPCI | 2 |
| SDCC1 | 2 |
| SDCC2 | 2 |
| MIN2$_{33-24}$ | 10 |
| P | 12 |

TABLE 4

Word 1 - Abbreviated Address Word

| Information Element | Length (bits) |
|---|---|
| T$_1$T$_2$ | 2 |
| DCC | 2 |

TABLE 4-continued

Word 1 - Abbreviated Address Word

| Information Element | Length (bits) |
|---|---|
| MIN1$_{23-0}$ | 24 |
| P | 12 |

TABLE 5

Word 2 - Extended Address Word

Information Element

T$_1$ T$_2$ = 10
SCC
SCC = 11

| Information Element | Length (bits) |
|---|---|
| MIN2$_{33-24}$ | 10 |
| EF=0 | 1 |
| LOCAL/MSG_TYPE | 5 |
| ORDQ = TBD | 3 |
| ORDER = TBD | 5 |
| P | 12 |

TABLE 6

Word 3 - PCS information Word

| Information Element | Length (bits) |
|---|---|
| T$_1$T$_2$ = 10 | 2 |
| SCC = 11 | 2 |
| PCS_CDMA_FREQ | 11 |
| PCS_CDMA_AVAIL | 1 |
| HSD_FREQ | 11 |
| HSD_AVAIL | 1 |
| P | 12 |

From step 510, operation proceeds to step 512 wherein the selection unit 120 within the subscribing unit 106 selects a channel within the PCS band upon which it will operate. At step 512, the selection unit 120 also selects the protocol under which communication will occur. After the selection at step 512, operation proceeds to step 514 wherein the subscribing unit and the network coordinate further operation of the subscribing unit within the service area.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A subscribing unit comprising:
   a case;
   an antenna coupled to the case;
   a wireless interface disposed within the case and coupled to the antenna that facilitates communication with a base station to receive a broadcast message from the base station, the broadcast message indicating the base station's supported operations in a plurality of frequency bands and according to a plurality of communication protocols;

wherein the wireless interface also facilitates transmission of a request to the base station based upon contents of the broadcast message, the request requesting additional information regarding one of the plurality of frequency bands or one of the plurality of communication protocols supported by the base station;

wherein the subscribing unit receives additional information regarding one of the plurality of frequency bands or one of the plurality of communication protocols supported by the base station;

wherein the subscribing unit selects a frequency band and a communication protocol from the plurality of frequency bands and the plurality of communication protocols; and wherein the subscribing unit communicates with the base station in the selected frequency band and according to the selected communication protocol.

2. The subscribing unit of claim 1, wherein the additional information relates to a digital communication protocol.

3. The subscribing unit of claim 1, wherein:

the broadcast message further includes channel information, the channel information indicating available channels within the frequency bands; and the selection unit selecting the at least one channel of the plurality of available channels.

4. The subscribing unit of claim 1, wherein the plurality of frequency bands include the 800 MHz frequency band and the 1900 MHz frequency band.

5. The subscribing unit of claim 1, wherein the plurality of communication protocols include an analog protocol and a code division multiple access protocol.

6. The subscribing unit of claim 5, wherein the plurality of communication protocols is selected from the group consisting of IS-91A, TIA/EIA 691, TIA/EIA 553A, IS-95B and later revision protocols.

7. The subscribing unit of claim 1, wherein the information request includes a request for information regarding code division multiple access operation in the 1900 MHz frequency band.

8. The subscribing unit of claim 1, wherein the additional information relates to high speed data operations.

9. A subscribing unit comprising:

a case;

an antenna coupled to the case;

a wireless interface disposed within the case and coupled to the antenna that facilitates communication with a base station to receive a broadcast message from the base station, the broadcast message including information to indicate the base station's supported operations in a plurality of frequency bands and according to a plurality of communication protocols, wherein the plurality of communication protocols includes an analog communication protocol and a digital communication protocol;

wherein the wireless interface also facilitates transmission of a request to the base station based upon contents of the broadcast message, the request requesting additional information regarding the digital communication protocol;

wherein the subscribing unit receives additional information regarding the digital communication protocol;

wherein the subscribing unit selects a frequency band and a communication protocol from the plurality of frequency bands and the plurality of communication protocols; and wherein the subscribing unit communicates with the base station in the selected frequency band and according to the selected communication protocol.

10. The subscribing unit of claim 9, wherein the additional information indicates channels available that support the digital communication protocol.

11. The subscribing unit of claim 9, wherein the additional information relates to high speed data operations.

12. The subscribing unit of claim 9, wherein:

the digital protocol comprises a CDMA communication protocol; and the additional information indicates channels in which the CDMA communication protocol is supported.

13. The subscribing unit of claim 12, wherein the channels in which the CDMA communication protocol is supported reside in the 1900 MHz frequency band.

14. A subscribing unit comprising:

a case;

an antenna coupled to the case;

a wireless interface disposed within the case and coupled to the antenna that facilitates communication with a base station to receive a broadcast message from the base station, the broadcast message including information to indicate:

a channel to acquire in the 800 MHz frequency band;

whether CDMA operation is available in the 800 MHz frequency band; and whether CDMA operation is available in the 1900 MHz frequency band;

wherein the wireless interface also facilitates transmission of a request to the base station based upon contents of the broadcast message, the request requesting additional information regarding CDMA operation in the 1900 MHz frequency band;

wherein the subscribing unit receives additional information regarding CDMA operation in the 1900 MHz frequency band;

wherein the subscribing unit determines a frequency band in which to operate and whether to operate according to the CDMA operations or analog operations; and wherein the subscribing unit communicates with the base station in the selected frequency band and a selected one of CDMA operations or analog operations.

15. The subscribing unit of claim 14, wherein the additional information regarding CDMA operation in the 1900 MHz frequency band indicates whether CDMA operations are available in the 1900 MHz frequency band.

16. The subscribing unit of claim 14, wherein the additional information regarding CDMA operation in the 1900 MHz frequency band indicates channels available for CDMA operations in the 1900 MHz frequency band.

17. The subscribing unit of claim 14, wherein the additional information regarding CDMA operation in the 1900 MHz frequency band indicates availability of high speed data service.

* * * * *